United States Patent
Hurst

(10) Patent No.: US 9,556,029 B2
(45) Date of Patent: Jan. 31, 2017

(54) LIQUID OXYGEN PRODUCTION DEVICE AND METHOD

(75) Inventor: Gregg Hurst, Acworth, GA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 385 days.

(21) Appl. No.: 13/132,465

(22) PCT Filed: Nov. 21, 2009

(86) PCT No.: PCT/IB2009/055263
§ 371 (c)(1),
(2), (4) Date: Jun. 2, 2011

(87) PCT Pub. No.: WO2010/073141
PCT Pub. Date: Jul. 1, 2010

(65) Prior Publication Data
US 2011/0239698 A1    Oct. 6, 2011

Related U.S. Application Data

(60) Provisional application No. 61/139,741, filed on Dec. 22, 2008.

(51) Int. Cl.
*B01D 53/04* (2006.01)
*C01B 13/02* (2006.01)
*B01D 53/053* (2006.01)

(52) U.S. Cl.
CPC .......... *C01B 13/0259* (2013.01); *B01D 53/04* (2013.01); *B01D 53/053* (2013.01);
(Continued)

(58) Field of Classification Search
CPC ... B01D 53/04; B01D 2256/12; F25J 3/04036; F25J 3/04975; F25J 3/04981
(Continued)

(56) References Cited

U.S. PATENT DOCUMENTS 4,561,287 A    12/1985  Rowland
4,648,888 A  *  3/1987  Rowland ............................ 95/8
(Continued)

FOREIGN PATENT DOCUMENTS

JP    2002253675 A    9/2002
JP    2004344241 A    12/2004
(Continued)

OTHER PUBLICATIONS

JP2005312766A Translation.*

*Primary Examiner* — Frantz Jules
*Assistant Examiner* — Brian King
(74) *Attorney, Agent, or Firm* — Michael W. Haas

(57) ABSTRACT

A method for controlling an oxygen liquefaction device includes measuring a flow rate from an oxygen concentration subsystem to a liquefaction subsystem, comparing the flow rate to a flow rate setpoint, and adjusting a cycle timing of the oxygen concentration subsystem in accordance with the comparing. A device for producing liquid oxygen, includes an oxygen concentrator, a liquefaction system, that receives oxygen enriched gas from the concentrator, and condenses it to produce a liquid product. The device further includes a liquid product storage tank, a sensor, that measures a flow rate from the oxygen concentrator to the liquefaction system and a controller that adjusts an oxygen concentrating cycle time in response to the measured flow rate.

14 Claims, 2 Drawing Sheets

(52) U.S. Cl.
CPC .... *B01D 2256/12* (2013.01); *B01D 2257/102* (2013.01); *B01D 2259/40007* (2013.01); *B01D 2259/416* (2013.01); *B01D 2259/4533* (2013.01); *C01B 2210/0046* (2013.01)

(58) Field of Classification Search
USPC ..................................... 62/615, 606; 96/114
See application file for complete search history.

(56) References Cited

U.S. PATENT DOCUMENTS

| | | | |
|---|---|---|---|
| 5,893,275 A * | 4/1999 | Henry | 62/615 |
| 5,906,672 A * | 5/1999 | Michaels | B01D 53/047 |
| | | | 95/12 |
| 5,917,135 A | 6/1999 | Michaels | |
| 5,988,165 A | 11/1999 | Richey, II | |
| 7,370,651 B2 * | 5/2008 | Holder | A61M 16/0666 |
| | | | 128/204.19 |
| RE43,398 E * | 5/2012 | Honkonen | B01D 5/0039 |
| | | | 128/200.24 |
| 2005/0274142 A1* | 12/2005 | Corey | 62/643 |
| 2007/0227360 A1* | 10/2007 | Atlas et al. | 96/121 |
| 2008/0047435 A1* | 2/2008 | Dolensky | A62B 21/00 |
| | | | 96/116 |

FOREIGN PATENT DOCUMENTS

| | | |
|---|---|---|
| JP | 2005312766 A | 11/2005 |
| WO | WO2006108092 A1 | 10/2006 |
| WO | 2008047435 | 4/2008 |

\* cited by examiner

LIQUID OXYGEN PRODUCTION DEVICE AND METHOD

CROSS-REFERENCE TO RELATED APPLICATIONS

This patent application claims the priority benefit under 35 U.S.C. §119(e) of U.S. Provisional Application No. 61/139,741 filed on Dec. 22, 2008, the contents of which are herein incorporated by reference.

BACKGROUND OF THE INVENTION

1. Field of the Invention

The present invention relates generally to systems for production of liquefied gases, and, more particularly, to control of systems for production of liquefied oxygen in a non-industrial environment.

2. Description of the Related Art

For patients having a need for home based oxygen therapy, compressed gas tank deliveries can be inconvenient and expensive. Oxygen tanks provide a limited supply and require a great deal of storage space within the home, particularly where a patient's usage is high. As a result, there is a need for systems for generating oxygen in the home, such that an essentially unlimited supply of oxygen can be provided.

Home oxygen concentrators, typically employing a pressure swing adsorption system to separate oxygen from air, are capable of providing continuous oxygen delivery in the range of about 1-6 liters per minute. In general, for trips outside the home, patients using oxygen concentrators carry oxygen tanks that are delivered by an outside vendor, supplemental to the concentrator.

As an alternative to separate tanks, certain systems exist that make use of a further condenser system for liquefying the gaseous oxygen and storing it for future use. For traveling, the liquid oxygen is transferred to a portable unit to be carried by the patient. The portable units can carry several hours supply of oxygen in liquid form, allowing the patient to be independent both of the home concentrator and of expendable compressed gas tanks One such system is disclosed in U.S. Pat. No. 5,893,275, the contents of which are herein incorporated by reference.

SUMMARY OF THE INVENTION

One aspect of the invention relates to a method controlling a system for producing liquid oxygen, including measuring a flow rate from an oxygen concentration subsystem to a liquefaction subsystem, comparing the flow rate to a flow rate setpoint, and adjusting a cycle timing of the oxygen concentration subsystem in accordance with the comparing.

Another aspect of the invention relates to a device for producing liquid oxygen, including an oxygen concentration subsystem, a liquefaction subsystem, in fluid communication with the oxygen concentration subsystem and constructed and arranged to receive oxygen enriched gas therefrom, and to condense the oxygen enriched gas to produce a liquid product, a liquid product storage tank, in fluid communication with the liquefaction subsystem and constructed and arranged to receive the liquid product from the liquefaction subsystem, a sensor, configured and arranged to measure a flow rate from the oxygen concentration subsystem to the liquefaction subsystem, and a controller, configured and arranged to control an oxygen concentrating cycle time in the oxygen concentration subsystem in response to the measured flow rate.

Another aspect of the invention relates to a device for producing liquid oxygen, including a pressure swing adsorption oxygen concentration subsystem that includes, a molecular sieve, constructed and arranged to receive compressed air and to adsorb nitrogen therefrom to produce an oxygen enriched gas, a feed valve, controllable to be open for a feed cycle during which the compressed air is allowed to flow to be received by the molecular sieve, a product tank, in fluid communication with the molecular sieve and constructed and arranged to receive the oxygen enriched gas from the molecular sieve, and a sensor, disposed in fluid communication with the product tank to measure a pressure therein.

The device further includes a liquefaction subsystem, in fluid communication with the oxygen concentration subsystem and constructed and arranged to receive the oxygen enriched gas therefrom, and to condense the oxygen enriched gas to produce a liquid product, a liquid product storage tank, in fluid communication with the liquefaction subsystem and constructed and arranged to receive the liquid product from the liquefaction subsystem, a processor, configured and arranged to determine a measured flow rate based on the measured pressure, and a controller, configured and arranged to control a duration of the feed cycle in response to the measured flow rate.

Still another aspect of the invention relates to a machine readable medium comprising machine executable instructions for performing the foregoing methods or for controlling the foregoing devices.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE EXEMPLARY EMBODIMENTS

Figure 1:
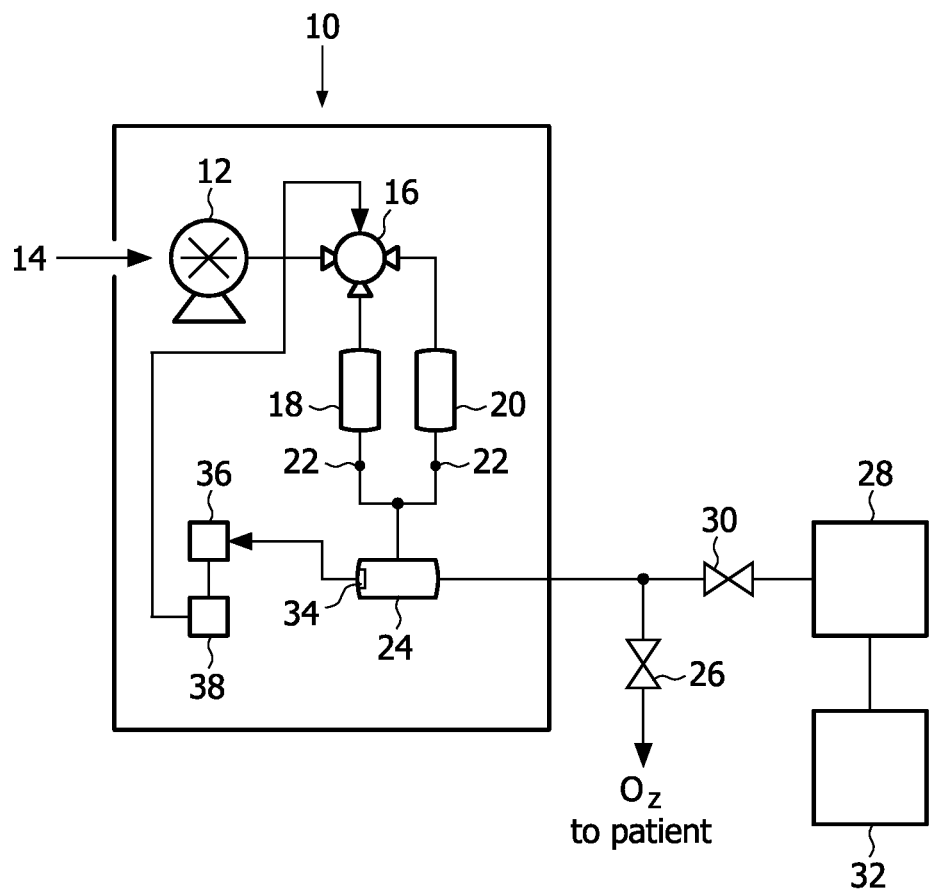
FIG. 1 schematically illustrates an oxygen generating system in accordance with an embodiment of the invention.

FIG. 1 illustrates an embodiment of a typical system for production of a liquefied gas in a home environment. An oxygen concentration subsystem, or separator unit, 10 operates by a pressure swing adsorption (PSA) method. Note that though this embodiment relates to the PSA method, other approaches, for example, membrane separation or ionic conduction, may be used for gas separation within the scope of the present invention.

Separator unit 10 includes a compressor 12 that compresses ambient air 14, and provides it to a valve 16 that controls flow into a pair of molecular sieves 18, 20. In an embodiment, ambient air 14 first passes through an air filter to remove particulate matter prior to compression and oxygen concentration. In operation, valve 16 alternately provides the compressed air to the sieves, each of which includes a nitrogen binding material such as zeolite. As the compressed air passes through the zeolite, nitrogen is extracted, leaving an oxygen-enriched gas. While one of the sieves is receiving compressed air for nitrogen extraction in a concentration cycle, the other is operating in a regenerating mode in which bound nitrogen is released, preparing that sieve for a next concentration cycle.

Oxygen-enriched air passes through check valves 22 to reach a product tank 24 where it is stored. From product tank 24, oxygen-enriched air may be provided directly to a patient via valve 26, or to a liquefaction subsystem 28 via valve 30. Prior to delivery to the patient, the gas may be passed through a distilled water bubbler to replace/increase humidity, thereby increasing patient comfort. As necessary or desirable, the patient delivery line may include a connector for attaching a breathing mask or a nasal cannula.

After liquefaction, the product is provided to a dewar 32 for storage. For portable use, the dewar may be removably attachable to liquefaction subsystem 28. Alternately, there may be a second, portable dewar (not shown in FIG. 1) provided that is removably connectable to storage dewar 32. Once filled from storage dewar 32, the portable dewar may travel with the patient, providing an on-going oxygen supply while away from the concentrator. As with the direct line, a nasal cannula or breathing mask may be provided for supplying the oxygen to the patient.

Liquefaction subsystem 28 is, for example, a cryocooler, such as a Kleemenko cycle cryocooler. Alternately, the Stirling, Carnot, Brayton, or Ericsson cycles may be employed. Examples of appropriate cryocoolers may be found, for example, in U.S. Pat. No. 5,893,275, the contents of which are incorporated herein by reference.

As will be appreciated, in a pressure swing adsorption/liquefaction device as described, purity of the product fluid can depend on appropriate control of valve sequencing and timing. That is, the system's valves should properly prevent flow of mixed gases into the product storage tank and backflow of oxygen enriched gas from the product tank to the sieve canisters, among other functions. Likewise, performance of the liquefaction subsystem may vary. For example, changes in ambient temperature can alter the performance of a heat exchanger in the liquefier.

In general, it is desirable to provide oxygen gas at a purity level of 90%-96% or greater, with levels of 95% purity and above being even more desirable. Likewise, it is desirable to provide for flow rates of up to 5 liters/minute or more, while maintaining the desired purity. In some cases, such high flow rates can result in decreased purity of generated oxygen, and/or difficulties in running the liquefaction subsystem. For example, at high flow rates, it can be difficult for the gas to reach its liquefaction temperature within the subsystem, meaning that no liquid oxygen is produced for storage in storage dewar 32. For certain liquefaction subsystems, optimal performance is achieved at a rate of about 3-4 liters per minute.

In accordance with an embodiment of the present invention, a pressure sensor 34 is provided in product tank 24 of the concentrator 10. A pressure signal from pressure sensor 34 is used to estimate flow from concentrator 10 to the liquefaction subsystem 28.

Based on the estimated flow, an algorithm modifies the timing of pressure and purge cycles in the PSA concentrator, so that product tank pressure and output flow are kept within a specified range. As a result, the control algorithm is able to account for variables including, for example, liquefaction subsystem performance.

Figure 2:
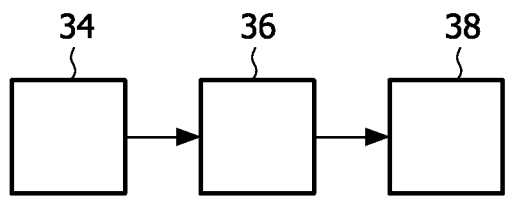
FIG. 2 is a schematic illustration of a portion of a circuit for controlling an oxygen generating system.

As schematically illustrated in FIG. 2, pressure sensor 34 outputs its signal, representing pressure in the product tank to an analog to digital converter (ADC) 36. Alternately, the pressure sensor may be located at another point in the system or a flow sensor could be used to provide a control signal for the feedback loop. In principle, the flow measurement should take into consideration flow being supplied to the sensor or the total flow output of the system. Measured pressures may form the basis for direct calculation of flow rates, or alternately, may be referenced in a lookup table that includes correspondences between measured pressures and expected flow rates.

The ADC, in turn, provides the pressure signal to controller 38 where it forms an input to the algorithm illustrated in FIG. 3, described below. In an embodiment, flow rate is determined based on a slope of the pressure signal in the product tank. As will be appreciated, change in pressure in the tank correlates to flow rate, which is further dependent on tank volume and temperature. As tank volume is a constant, for substantially constant temperatures, the pressure change alone gives a good indicator of flow rate. Where temperature is expected to vary significantly, it may be useful to include a temperature sensor as an input to the flow calculations.

The primary variables in the algorithm are the valve feed time (i.e., the time that the sieve is being supplied with compressed air) and valve purge time (i.e., the time that a nitrogen loaded sieve is given to discharge nitrogen to prepare it for a following feed cycle). In an alternate embodiment, purge time may be controlled similarly to the control provided for feed time. In the embodiment of FIG. 3, valve feed time is the varied in accordance with the measured flow rate. The estimated flow is measured, and compared with a set point, or target flow value that may be stored, for example, in non-volatile RAM. Where the measured flow rate is too high, feed time is reduced, while for low flow rates, the feed time is increased. The measurement and adjustment cycle is applied every 60 seconds, though it should be appreciated that alternate measurement cycle times may be used.

Figure 3:
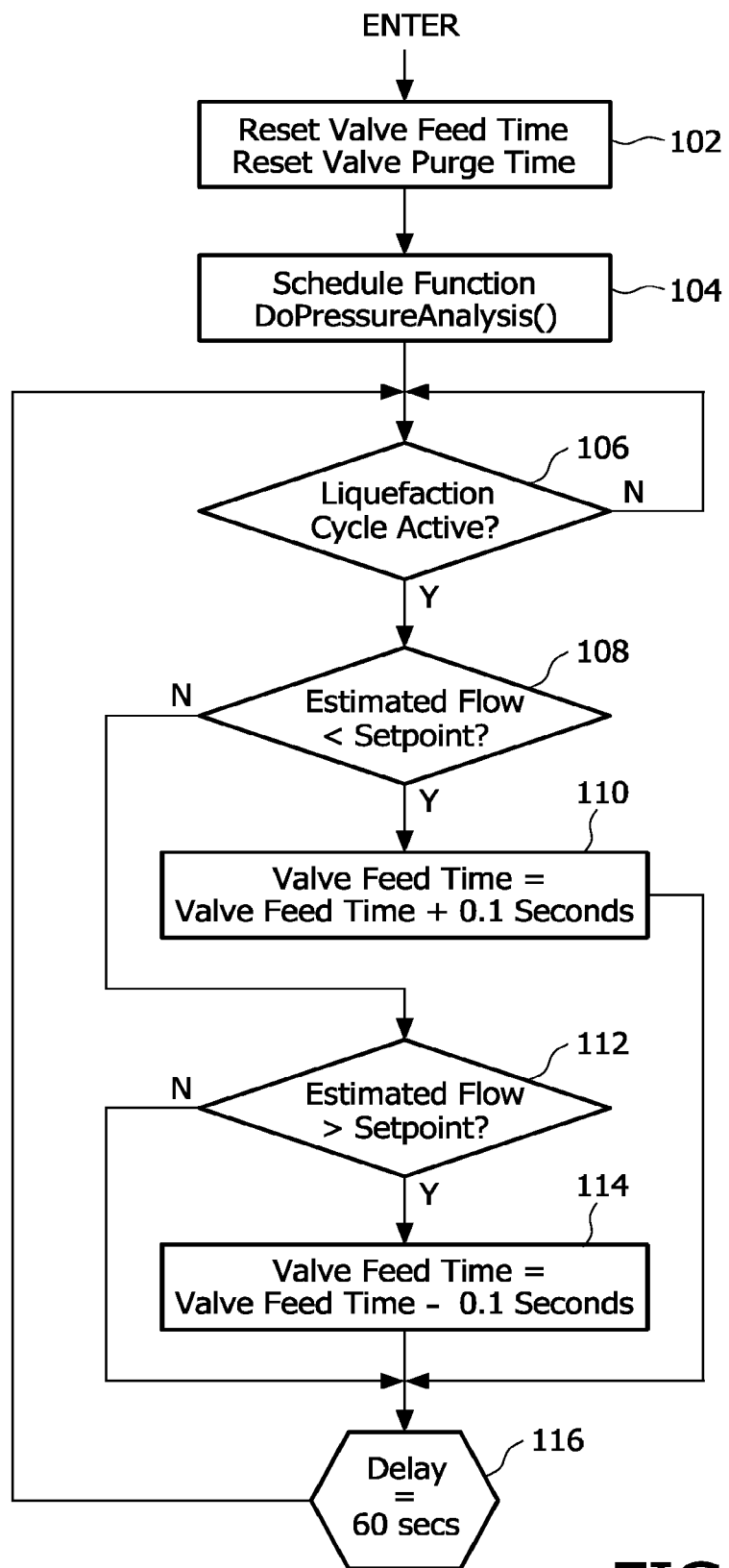
FIG. 3 is a flowchart describing acts performed in a method in accordance with an embodiment of the invention.

As illustrated in FIG. 3, a method in accordance with an embodiment of the invention begins with each of the two valve timings set to a respective starting value 102. At 104, the flow value is determined, based on the measured pressure. The flow value calculation is performed at controller 38, which may be, for example, a microprocessor or ASIC, programmed with the appropriate instructions, both for flow calculation and for outputting valve control signals. As will be appreciated, embodiments may include variations in which these functions are separated into separate processors/controllers without straying from the principles of the present invention.

A check 106 is made to determine whether the liquefaction cycle is active. If not, the sequence is escaped and restarts at the beginning Note that it may be useful to control flow rate for reasons other than improving the liquefaction process. For example, it may be useful to help control minimum purity of a gas output directly to a patient. In such cases, the check 106 may be omitted and the remainder of the control algorithm applied irrespective of the state of the liquefaction process.

A comparison 108 is made between the calculated or estimated flow and the setpoint. Where estimated flow is less than the setpoint, control passes to 110 where the valve feed time is incremented. By way of example, feed time may be incremented by 0.1 s, though larger or smaller increments may be useful, depending on the specific equipment being controlled. Alternately, the increment may be a percentage of the current feed time. As described in more detail below, the increment may be proportional to or otherwise depend on a difference between the setpoint and the measured flow.

Where estimated flow is not less than the setpoint, control passes to 112, to determine whether estimated flow is greater than the setpoint. If yes, then control passes to 114 where feed time is decremented. If not (i.e., where estimated flow is equal to the setpoint), control passes to 116. As with the incrementing, decrementing is in steps of 0.1 s in the illustrated embodiment, though other times may be suitable, depending on the specific system.

At 116, a one minute delay occurs before the next check for an active liquefaction cycle and flow check. As will be apparent, the delay may be adjusted depending on the specific machine under control.

In an embodiment, it may be useful to provide a variable delay. For example, where the estimated flow varies significantly, and valve feed time is being adjusted on a majority of cycles through the control loop, the delay time may be reduced to provide an increased control bandwidth.

Likewise, the increment and decrement interval may be adjustable. In a particular example, the interval may be dependent on a difference between the setpoint and the estimated flow. That is, where estimated flow is close to the setpoint flow, the increment is small, while for large discrepancies, the increment is relatively larger. In another example, where the correction is too large, there may be an oscillating overcorrection. In the case where estimated flow fluctuates back and forth from greater than to less than the setpoint, the increment may optionally be reduced in response. By way of example, where a sequence of three or more measurements result in alternating increments and decrements, the controller may decrease the increment value by half Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method of controlling a system for producing liquid oxygen, wherein the system includes an oxygen concentration subsystem and a liquefaction subsystem, the method comprising:
    determining whether the liquefaction subsystem is active;
    producing, by the oxygen concentration subsystem, oxygen-enriched gas;
    providing the oxygen-enriched gas to a user, through a patient valve that fluidly communicates between the oxygen concentration subsystem and the user;
    providing the oxygen-enriched gas to the liquefaction subsystem, through a liquefaction valve that fluidly communicates between the oxygen concentration subsystem and the liquefaction subsystem;
    condensing, by the liquefaction subsystem, the oxygen-enriched gas to produce a liquid product;
    measuring a flow rate from the oxygen concentration subsystem to the liquefaction subsystem, wherein the oxygen concentration subsystem operates based on a cycle timing, wherein the cycle timing includes a feed cycle and a purge cycle;
    comparing the measured flow rate from the oxygen concentration subsystem to the liquefaction subsystem to a flow rate setpoint; and
    responsive to a determination that the liquefaction subsystem is active and further responsive to measuring the flow rate from the oxygen concentration subsystem to the liquefaction subsystem, adjusting the cycle timing of the oxygen concentration subsystem based on the measured flow rate from the oxygen concentration. subsystem to the liquefaction subsystem and the comparison of the measured flow rate from the oxygen concentration subsystem to the liquefaction subsystem to the flow rate set point,
    wherein the adjusting of the cycle timing includes adjusting a duration of a next subsequent feed cycle relative to a duration of an immediately previous feed cycle by a predetermined interval of time.

2. A method as in claim 1, wherein the measuring comprises measuring a pressure in a product tank of the oxygen concentration subsystem.

3. A method as in claim 2, wherein the measuring further comprises determining a rate of change of the pressure in the product tank.

4. A method as in claim 2, wherein the measuring further comprises estimating a flow rate based on the measured pressure.

5. A method as in claim 1, wherein the setpoint comprises a selected flow rate.

6. A method as in claim 1, wherein the setpoint comprises a rate of change of pressure in a product tank of the oxygen concentration subsystem.

7. A method as in claim 1, wherein the adjusting the cycle timing further comprises:
    responsive to the flow rate being higher than the setpoint, decrementing a next subsequent valve feed time relative to an immediately previous valve feed time by the predetermined interval of time;
    responsive to the flow rate being lower than the setpoint, incrementing the next subsequent valve feed time relative to the immediately previous valve feed time by the predetermined interval of time; and
    responsive to the flow rate being equal to the setpoint, maintaining the valve feed time at the immediately previous valve feed time.

8. A method as in claim 1, wherein the duration of the feed cycle is equal to or greater than a valve feed time, wherein the valve feed time corresponds to a duration when a sieve of the oxygen concentrator subsystem is being supplied with compressed air, wherein the purge cycle has a purge duration that is equal to or greater than a valve purge time, wherein the valve purge time corresponds to a duration when the sieve discharges nitrogen, and wherein the adjusting comprises adjusting the valve feed time or the valve purge time.

9. A method as in claim 1, the method further comprising, based on the comparison of the measured flow rate from the oxygen concentration subsystem to the liquefaction subsystem to the flow rate set point, modifying the predetermined interval of time based on a difference between the measured flow rate from the oxygen concentration subsystem to the liquefaction subsystem and the flow rate set point.

10. A device for producing liquid oxygen, comprising:
an oxygen concentration subsystem configured to operate based on a cycle timing, wherein the cycle timing includes a feed cycle and a purge cycle, wherein the oxygen concentration subsystem is configured to produce oxygen-enriched gas;
a liquefaction subsystem including a liquefaction valve, the liquefaction subsystem being in fluid communication with the oxygen concentration subsystem through the liquefaction valve, wherein the liquefaction valve is configured to control provision of the oxygen-enriched gas from the oxygen concentration subsystem to the liquefaction subsystem, wherein the liquefaction subsystem is constructed and arranged to receive the oxygen-enriched gas from the oxygen concentration subsystem, and further constructed and arranged to condense the oxygen-enriched gas to produce a liquid product;
a liquid product storage tank, in fluid communication with the liquefaction subsystem and constructed and arranged to receive the liquid product from the liquefaction subsystem;
a sensor, configured and arranged to perform a measurement of a flow rate from the oxygen concentration subsystem through the liquefaction valve to the liquefaction subsystem;
a patient valve in fluid communication with the oxygen concentration subsystem, wherein the patient valve is configured to control provision of the oxygen-enriched gas from the oxygen concentration subsystem to a user; and
a controller, configured and arranged to:
  (i) determine whether the liquefaction subsystem is active,
  (ii) compare the measured flow rate from the oxygen concentration subsystem to the liquefaction subsystem to a flow rate setpoint; and
  (iii) make an adjustment of the cycle timing, responsive to a determination that the liquefaction subsystem is active and further responsive to the measurement of the flow rate from the oxygen concentration subsystem to the liquefaction subsystem, wherein the adjustment of the cycle timing includes adjustment of a duration of a next subsequent feed cycle relative to a duration of an immediately previous feed cycle by a predetermined interval of time based on the measured flow rate from the oxygen concentration subsystem to the liquefaction subsystem and the comparison of the measured flow rate from the oxygen concentration subsystem to the liquefaction subsystem to the flow rate set point.

11. A device as in claim 10, wherein the sensor comprises a pressure sensor, positioned to measure a pressure in at least a portion of the oxygen concentration subsystem and to determine the measured flow rate based on the measured pressure.

12. A device as in claim 11, wherein the oxygen concentration subsystem further comprises a product gas storage tank, constructed and arranged to collect the oxygen-enriched gas from the oxygen concentration subsystem and to supply the oxygen-enriched gas to the liquefaction subsystem and wherein the pressure sensor is positioned to measure the pressure in the product gas storage tank.

13. A device as in claim 10, wherein the liquid product storage tank is removable and further comprises a controllable valve constructed and arranged to allow a user to select a delivery rate for oxygen-enriched gas produced by evaporation of liquid product stored within the liquid oxygen storage tank.

14. A device as in claim 10, wherein the controller is further configured and arranged to modify the predetermined interval of time based on a difference between the measured flow rate from the oxygen concentration subsystem to the liquefaction subsystem and the flow rate set point.

* * * * *